United States Patent
Guo

(10) Patent No.: US 11,237,791 B2
(45) Date of Patent: Feb. 1, 2022

(54) METHOD, DEVICE AND SYSTEM FOR CONTROLLING SCREEN PROJECTION

(71) Applicants: GUANGZHOU SHIYUAN ELECTRONICS CO., LTD., Guangdong (CN); GUANGZHOU SHIRUI ELECTRONICS CO., LTD., Guangdong (CN)

(72) Inventor: Qingwei Guo, Guangdong (CN)

(73) Assignees: GUANGZHOU SHIYUAN ELECTRONICS CO., LTD., Guangdong (CN); GUANGZHOU SHIRUI ELECTRONICS CO. LTD., Guangdong (CN)

(*) Notice: Subject to any disclaimer, the term of this patent is extended or adjusted under 35 U.S.C. 154(b) by 0 days.

(21) Appl. No.: 17/187,062

(22) Filed: Feb. 26, 2021

(65) Prior Publication Data

US 2021/0182013 A1    Jun. 17, 2021

Related U.S. Application Data

(63) Continuation of application No. PCT/CN2018/112719, filed on Oct. 30, 2018.

(51) Int. Cl.
  *G06F 3/14*   (2006.01)
  *H04W 76/10*  (2018.01)
  *G06F 3/147*  (2006.01)

(52) U.S. Cl.
  CPC ............ *G06F 3/1454* (2013.01); *G06F 3/147* (2013.01); *H04W 76/10* (2018.02)

(58) Field of Classification Search
  CPC ...... G06F 3/1454; G06F 3/1423; G06F 3/147; G09G 2370/16; H04W 76/10;
  (Continued)

(56) References Cited

U.S. PATENT DOCUMENTS 9,002,987 B2 * 4/2015 Park ..................... H04L 12/281
                                                            709/219
2012/0173662 A1   7/2012 Toledano et al.
2013/0278484 A1  10/2013 Hwang et al.
(Continued)

FOREIGN PATENT DOCUMENTS

CN   103561088 A   2/2014
CN   104978973 A  10/2015
(Continued)

OTHER PUBLICATIONS

International Application No. PCT/CN2018/112719, International Search Report and Written Opinion dated May 30, 2019, 11 pages.
European Application No. 18931871, Extended European Search Report dated Sep. 28, 2021, 9 pages.
(Continued)

*Primary Examiner* — Koosha Sharifi-Tafreshi
(74) *Attorney, Agent, or Firm* — Zhong Law, LLC

(57) ABSTRACT

The present disclosure discloses a method, device, and system for controlling screen projection. The method comprises a first terminal acquiring a device list, wherein the device list includes identification information of a second terminal, and the second terminal is a terminal that accesses a same server as the first terminal; the first terminal receiving a selection instruction, wherein the selection instruction is used to select target identification information from the device list; the first terminal sending a screen projection control instruction to the server, wherein the screen projection control instruction includes target identification information, and the screen projection control instruction is forwarded to a target second terminal corresponding to the target identification information via the server, so as to control the target second terminal to project the screen to a first screen projection receiving end.

16 Claims, 6 Drawing Sheets

(58) Field of Classification Search
CPC ......... H04N 21/25808; H04N 21/4122; H04N 21/43637; H04N 21/43615; H04L 65/4084; H04L 65/4076; H04L 65/4092; H04L 65/4069
See application file for complete search history.

(56) References Cited

U.S. PATENT DOCUMENTS

| | | | |
|---|---|---|---|
| 2016/0070523 A1* | 3/2016 | Kim | G06F 3/147 345/2.3 |
| 2016/0255390 A1 | 9/2016 | Luo | |
| 2017/0201882 A1* | 7/2017 | O'Gorman | H04L 63/083 |
| 2017/0300285 A1 | 10/2017 | Yoshida | |
| 2018/0152977 A1 | 5/2018 | Baron et al. | |

FOREIGN PATENT DOCUMENTS

| | | |
|---|---|---|
| CN | 206100345 U | 4/2017 |
| CN | 107197084 A | 9/2017 |
| CN | 107526561 A | 12/2017 |
| CN | 108134813 A | 6/2018 |
| CN | 108200468 A | 6/2018 |
| EP | 3046309 A1 | 7/2016 |
| WO | 2015131454 A1 | 9/2015 |

OTHER PUBLICATIONS

Wifi Alliance, "Wi-Fi Certified Miracast (TM): Extending the Wi-Fi Experience to Seamless Video Display," Internet Citation, Sep. 19, 2012, pp. 1-18.

* cited by examiner

METHOD, DEVICE AND SYSTEM FOR CONTROLLING SCREEN PROJECTION

CROSS-REFERENCE TO RELATED APPLICATIONS

The present application is a continuation of International Application No. PCT/CN2018/112719 filed on Oct. 30, 18, which claims priority to Chinese Patent Application No. 201810988562.X, entitled "METHOD, DEVICE AND SYSTEM FOR CONTROLLING SCREEN PROJECTION," filed on Aug. 28, 2018. The contents of the above-identified application are incorporated by reference in their entireties.

FIELD OF THE INVENTION

The present disclosure relates to the field of screen projection, and in particular to a method, device and system for controlling screen projection.

BACKGROUND OF THE INVENTION

A wireless screen transmission solution refers to a sending end encoding a screen image and sending it to a receiving end (such as an interactive tablet), and the receiving end performing decoding and rendering of the encoded screen image.

At present, a commonly used method for controlling wireless screen transmission is to install a sending end program of wireless screen transmission at a terminal, and then project the screen to a receiving end through the sending end program. However, in such a scenario, if the same user needs to perform screen projection on the contents at multiple different terminals, the sending end program needs to be installed on each terminal, and then operation is performed at the multiple terminals respectively, resulting in a very complicated screen projection process. From this, it can be seen that existing screen projection solutions are rather simple, and difficult to meet the needs of users in multiple scenarios.

In the current technologies, a terminal can only perform screen projection control on its own contents, resulting in the problem of having only a simply method for controlling screen projection. Currently, no effective solution has been proposed to address this problem.

SUMMARY OF THE INVENTION

At least some of the embodiments of the present disclosure provide a method, device and system for controlling screen projection, so as to at least solve the following technical problem in existing screen projection technologies: a screen projection sending end can only perform screen projection control on its own contents, and as a result, in the case of multiple screen projection sending ends, different screen projection sending ends need to be controlled respectively, causing complex and complicated operations.

An aspect of one of the embodiments of the present disclosure provides a method for controlling screen projection, comprising: a first terminal acquiring a device list, wherein the device list includes identification information of a second terminal, and the second terminal is a terminal that uses the same account as the first terminal to log in to a server; the first terminal receiving a selection instruction, wherein the selection instruction is used to select target identification information from the device list; and the first terminal sending a screen projection control instruction to the server, wherein the screen projection control instruction includes the target identification information, and the screen projection control instruction is forwarded via the server to a target second terminal corresponding to the target identification information, so as to control the target second terminal to project the screen to a first screen projection receiving end.

Optionally, the first terminal receives the device list sent by the server, wherein the server generates the device list after the first terminal and the second terminal use the same account to log in to the server.

Optionally, the first terminal generates the screen projection control instruction according to the selection instruction, wherein the screen projection control instruction includes identification information of the target second terminal; and the first terminal sends the screen projection control instruction to the server.

Optionally, before the first terminal acquires the device list, the first terminal establishes a first communication link with a second screen projection receiving end; and the second terminal establishes a second communication link with the first screen projection receiving end.

Optionally, the first terminal receives the screen projection instruction; and the first terminal projects the screen to the second screen projection receiving end.

Optionally, the first terminal captures current display contents; and the first terminal performs encoding on the captured current display contents, and sends the encoded contents to the second screen projection receiving end, wherein the second screen projection receiving end decodes the encoded contents, and displays the decoded contents.

Optionally, after the first terminal sends the screen projection control instruction to the server, the first terminal sends the control instruction for ending screen projection to the server, wherein the control instruction for ending screen projection is forwarded to the target second terminal via the server, so as to control the target second terminal to stop projecting the screen to the first screen projection receiving end.

Another aspect of one of the embodiments of the present disclosure provides a method for controlling screen projection, comprising: a server sending a device list of a first terminal to the first terminal, wherein the device list includes identification information of a second terminal, the second terminal is a terminal that uses the same account as the first terminal to log in to the server; the server receiving a screen projection control instruction sent by the first terminal, wherein the screen projection control instruction is determined according to a selection instruction received by the first terminal, and the selection instruction is used to select target identification information from the device list; and the server forwarding the screen projection control instruction to a target second terminal corresponding to the target identification information, so as to control the target second terminal to project the screen to a first screen projection receiving end.

Optionally, the server determines the terminals that use the same account to log in to the server; and the server generates the device list of the first terminal according to the identification information of other terminals except the first terminal.

Optionally, the server parses out the target identification information from the screen projection control instruction; the server determines the target second terminal according to the target identification information; and the server forwards the screen projection control instruction to the target second terminal.

Another aspect of one of the embodiments of the present disclosure further provides a system for controlling screen projection, comprising: a first terminal configured to acquire a device list, receive a selection instruction, and send a screen projection control instruction to a server, wherein the device list includes identification information of a second terminal, the second terminal is a terminal configured to access the same server as the first terminal, and the selection instruction is used to select target identification information from the device list; a server configured to communicate with the first terminal and forward the screen projection control instruction to a target second terminal corresponding to the identification information; the target second terminal, wherein the target second terminal is configured to communicate with the server and the receiving end, and project the screen to a first screen projection receiving end according to the screen projection control instruction; and the first screen projection receiving end, wherein the first screen projection receiving end is configured to communicate with the target second terminal and display screen projection contents of the target second terminal.

Optionally, the first terminal and the second terminal are in the same local area network.

Optionally, a first communication link is provided between the first terminal and a second screen projection receiving end; and a second communication link is provided between the second terminal and the first screen projection receiving end.

Optionally, both the first screen projection receiving end and the second screen projection receiving end are interactive flat panels.

Another aspect of one of the embodiments of the present disclosure provides a device for controlling screen projection, comprising: an acquiring module configured to acquire a device list for a first terminal, wherein the device list includes identification information of a second terminal, and the second terminal is a terminal that accesses the same server as the first terminal; a first receiving module configured to receive a selection instruction for the first terminal, wherein the selection instruction is used to select target identification information from the device list; and a first sending module configured to send a screen projection control instruction from the first terminal to the server, wherein the screen projection control instruction includes target identification information, and the screen projection control instruction is forwarded via the server to a target second terminal corresponding to the target identification information, so as to control the target second terminal to project the screen to a first screen projection receiving end.

Another aspect of one of the embodiments of the present disclosure provides an apparatus for controlling screen projection, comprising: a second sending module configured to send a device list of a first terminal from a server to the first terminal, wherein the device list includes identification information of a second terminal, and the second terminal is a terminal that uses the same account as the first terminal to log in to the server; a second receiving module configured to receive a screen projection control instruction sent by the first terminal, wherein the screen projection control instruction is determined according to a selection instruction received by the first terminal, and the selection instruction is used to select a target second terminal from the device list; and a forwarding module configured to forward the screen projection control instruction to the target second terminal corresponding to target identification information, so as to control the target second terminal to project the screen to a first screen projection receiving end.

Another aspect of one of the embodiments of the present disclosure provides a storage medium storing instructions that, when executed by a device, cause the device to execute the following steps: acquiring, via a first terminal, a device list, wherein the device list includes identification information of a second terminal, and the second terminal is a terminal that accesses a same server as the first terminal; receiving, via the first terminal, a selection instruction, wherein the selection instruction is used to select target identification information from the device list; and sending, via the first terminal, a screen projection control instruction to the server, wherein the screen projection control instruction includes the target identification information, and the screen projection control instruction is forwarded to a target second terminal corresponding to the target identification information via the server, so as to control the target second terminal to project the screen to a first screen projection receiving end.

Another aspect of one of the embodiments of the present disclosure provides a storage medium stored therein instructions that, when executed by a device, cause the device to execute the following steps: acquiring, via a first terminal, a device list, wherein the device list includes identification information of a second terminal, and the second terminal is a terminal that accesses a same server as the first terminal; receiving, via the first terminal, a selection instruction, wherein the selection instruction is used to select target identification information from the device list; and sending, via the first terminal, a screen projection control instruction to the server, wherein the screen projection control instruction includes the target identification information, and the screen projection control instruction is forwarded to a target second terminal corresponding to the target identification information via the server, so as to control the target second terminal to project the screen to a first screen projection receiving end.

In at least some embodiments of the present disclosure, a first terminal acquires a device list, wherein the device list includes the identification information of a second terminal, and the second terminal is a terminal on which screen projection control by the first terminal is allowed to be performed; the first terminal receives a selection instruction, wherein the selection instruction is used to select a target second terminal from the device list; the first terminal sends a screen projection control instruction to the server, wherein the screen projection control instruction is used to control the target second terminal to perform screen projection; and the server forwards the screen projection control instruction to the target second terminal, so as to control the target second terminal to perform screen projection. The above-mentioned solution realizes the technical effect of controlling screen projection of multiple terminals by one terminal through a server that forwards screen projection control instructions. The solution solves the following problem in existing screen projection technologies: a screen projection sending end can only perform screen projection control on its own contents, and as a result, in the case of multiple screen projection sending ends, different screen projection sending ends need to be controlled respectively, causing complex and complicated operations.

BRIEF DESCRIPTION OF THE DRAWINGS

The drawings described herein are used to provide a further understanding of the present disclosure and constitute a part of the present disclosure. The exemplary embodiments and descriptions of the present disclosure are used to explain the present disclosure, and do not constitute an improper limitation of the present disclosure. In the accompanying drawings.

DESCRIPTION OF THE PREFERRED EMBODIMENTS

Figure 1:
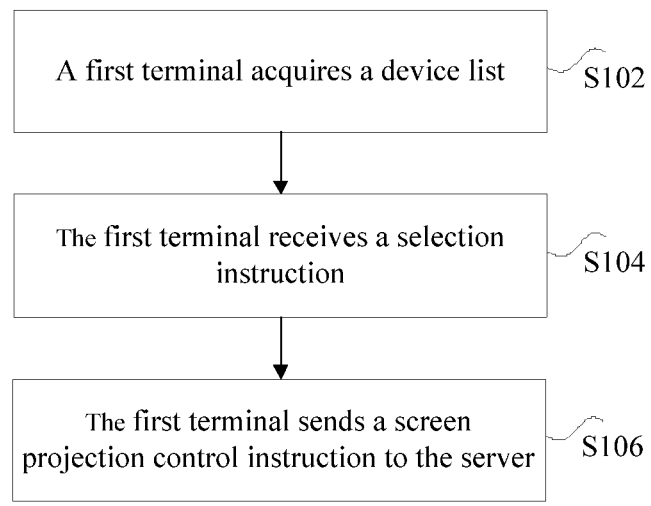
FIG. 1 is a flowchart illustrating a method for controlling screen projection according to an embodiment of the present disclosure.

In order to enable those skilled in the art to better understand the solutions of the present disclosure, the technical solutions in the embodiments of the present disclosure will be clearly and completely described with reference to the drawings in the embodiments of the present disclosure hereinafter. Obviously, the described embodiments are only a part of the embodiments of the present disclosure, not all the embodiments. Based on the embodiments in the present disclosure, all other embodiments obtained by those skilled in the art without creative work should fall within the claimed scope of the present disclosure.

It should be noted that the terms "first" and "second" in the description and claims of the present disclosure and the above-mentioned drawings are used to distinguish similar objects, and are not necessarily used to describe a specific sequence or order. It should be understood that the data used in this way can be interchanged under appropriate circumstances, so that the embodiments of the present disclosure described herein can be implemented in a sequence other than those illustrated or described herein. In addition, the terms "including" and "having" and any variations thereof are intended to cover non-exclusive inclusions. For example, a process, method, system, product, or device that includes a series of steps or units is not necessarily limited to those steps or units listed clearly, but may include other steps or units that are not clearly listed or are inherent to these processes, methods, products, or equipment.

Optionally, a screen projection application software is installed in a screen projection client and/or interactive flat panel, and the screen projection application software can be pre-installed in the above-mentioned screen projection client and/or interactive flat panel, or can be downloaded, installed and used from a third-party device or server when the screen projection client and/or interactive flat panel starts the screen projection application. When referred to herein, the third-party device is not limited to any specific type of devices in the embodiments.

Optionally, a screen projection application software is used to acquire the contents displayed by a screen projection client, use the contents as screen projection data, and instruct an interactive flat panel to display the contents. Embodiments are described with (but not limited) an example in which the screen projection client and the interactive flat panel are simultaneously installed with the screen projection application software. In the example, the screen projection application software of the screen projection client is used to acquire screen projection data and send the screen projection data directly or indirectly to the interactive flat panel. If indirectly sending the screen projection data, the screen projection client can send it to the interactive flat panel through a transfer device. The transfer device can be a wireless screen transmission device, or other devices with data transfer/processing capabilities.

The screen projection application software of the interactive flat panel is used to receive the screen projection data and convert the screen projection data into corresponding contents for the interactive flat panel to display. It should be noted that the resolution of the display screen of the screen projection client may be different from that of the display screen of the interactive flat panel, and the screen projection data is acquired based on the resolution of the screen projection client. Therefore, in order to display the screen projection data on the display screen of the interactive flat panel, the screen projection disclosure software determines the screen mapping relationship according to the resolution of the display screen of the screen projection client and that of the display screen of the interactive flat panel, and further converts the screen projection data according to the screen mapping relationship to obtain the screen projection contents. It should be noted that, in the embodiments, the screen projection contents and the display contents of the screen projection data are substantially the same, except that the resolution may be different.

Embodiment 1

According to the embodiments of the present disclosure, a method for controlling screen projection is provided. It should be noted that the steps shown in the flowchart of the accompanying drawings can be executed in a computer system such as a set of computer-executable instructions. Moreover, although a certain logical sequence is shown in the flowchart, in some cases, the steps shown or described may be executed in a different order from that shown or described herein.

FIG. 1 is a flowchart illustrating a method for controlling screen projection according to an embodiment of the present disclosure. As shown in FIG. 1, the method includes the following steps.

At step S102, a first terminal acquires a device list, wherein the device list includes identification information of a second terminal, and the second terminal is a to terminal that accesses a same server as the first terminal.

Optionally, the first terminal is a controlling end that performs screen projection control, and the device list is sent by a screen projection server to the first terminal to be used to provide the identification information of the second terminal to the first terminal. The second terminal is a controlled end on which screen projection control by the first terminal may be performed.

The second terminal may be a terminal that is in a same local area network as the first terminal and that has established a communication relationship with the server.

In an embodiment, the first terminal acquiring the device list includes the first terminal receiving the device list sent by the server, wherein the server generates the device list after the first terminal and the second terminal use a same account to log in to the server.

Optionally, after the first terminal and the second terminal use the same account to log in to the server, the server determines the terminals that allow screen projection control to be performed mutually. A user can select any one of these terminals as the first terminal and initiate a request for acquiring a device list to the server. Other terminals except the first terminal are second terminals. The server constructs the device list according to the identification information of the second terminals. The device list can include three pieces of information, including: an account, a device name, and a terminal UUID, wherein the account is an account for logging in to the server, and the device name is a name of a terminal. The server sends the device list to the first terminal, and the first terminal receives the device list.

In an embodiment, the terminals connected to a same router use the same account to log in to the server, and a user selects one of the terminals for operation. This terminal is the first terminal, and the other terminals are the second terminals. The user sends a request for acquiring a device list through the first terminal. After receiving the request for acquiring the device list, the server constructs the device list according to the identification information of the second terminal(s), and returns the device list to the first terminal.

At step S104, the first terminal receives a selection instruction, wherein the selection instruction is used to select target identification information from the device list.

Optionally, the selection instruction may be sent by a user through the operation of the first terminal, and the selection instruction is used to select the second terminal from the device list on which screen projection control is performed. The number of the selected target second terminals may be one or more.

In an embodiment, the first terminal displays the above-mentioned device list through a preset window, and the identification information of the second terminal that allows control by the first terminal is displayed in the device list. The second terminal that allows control by the first terminal may be a terminal that uses the same account as the first terminal to log in to the server. A user selects the identification information of the target second terminal to be controlled in the displayed device list, thereby sending a selection instruction to the first terminal.

At step S106, the first terminal sends a screen projection control instruction to the server, wherein the screen projection control instruction includes target identification information, and the screen projection control instruction is forwarded to the target second terminal corresponding to the target identification information via the server, so as to control the target second terminal to project the screen to a first screen projection receiving end.

Optionally, the above-mentioned screen projection control instruction includes identification information of the target second terminal, and is used by the server to determine the target second terminal selected by the user according to the target identification information.

It can be understood that the selection instruction received by the first terminal is a triggering condition for the first terminal to send the screen projection control instruction. After receiving the selection instruction, the first terminal constructs a screen projection control instruction to be sent to the server according to the received selection instruction.

In an embodiment, after receiving the selection instruction and determining the target second terminal, the first terminal constructs the screen projection control instruction according to the identification information of the target second terminal, and sends the screen projection control instruction to the server. Subsequent screen projection control is performed by the server.

After receiving the screen projection control instruction, the server sends the screen projection control instruction to the target second terminal according to the identification information of the target second terminal carried in the screen projection control instruction, so as to allow the first terminal to control the screen projection of the target second terminal.

In an embodiment, the first terminal sending the screen projection control instruction to the server includes the first terminal generating the screen projection control instruction according to the selection instruction, wherein the screen projection control instruction includes the identification information of the target second terminal, and the first terminal sends the screen projection control instruction to the server.

Optionally, the selection instruction received by the first terminal is used to determine the target second terminal. In order to enable the server to determine the target second terminal to be controlled, the screen projection control instruction sent by the first terminal to the server is generated according to the selection instruction, so as to cause the screen projection control instruction to carry the identification information of the target second terminal.

In an embodiment, the identification information of the second terminal in the device list includes a UUID (Universally Unique Identifier) of the second terminal. For example, the first terminal determines that the target second terminal is the second terminal with the identification information "23sdfifkkkrff44rtyg44555ertfgywe" according to the selection instruction. Consequently, the first terminal can generate a screen projection control instruction (23sdfifkkkrff44rtyg44555ertfgywe, starting screen projection), and send the screen projection control instruction to the server. After receiving the screen projection control instruction, the server can find the target second terminal according to the identification information of the target second terminal carried in the screen projection control instruction, and further performs screen projection control on the target second terminal.

The above-mentioned solution is suitable for a scenario where a user needs to perform screen projection control on multiple terminals. Taking a conference scenario as an example, if contents stored in multiple devices are to be projected on the screen in the conference, the conference host needs to switch back and forth among different terminals. If the above-mentioned solution is used, the conference host only needs to perform control at one main control terminal (that is, the above-mentioned first terminal), and the screen projection control of all terminals in the local area network can be completed. This simplifies the operation associated with controlling screen projection of multiple terminals and increases the convenience of screen projection control.

As set forth herein, in the above-mentioned embodiments of the present disclosure, a first terminal acquires a device list, wherein the device list includes the identification information of a second terminal, and the second terminal is a terminal that accesses a same server as the first terminal. The first terminal receives a selection instruction, wherein the selection instruction is used to select target identification information from the device list. The first terminal sends a screen projection control instruction to the server, wherein the screen projection control instruction includes the target identification information, and the screen projection control instruction is forwarded to a target second terminal corresponding to the target identification information via the server, so as to control the target second terminal to project the screen to the first screen projection receiving end. The above-mentioned solution realizes the technical effect of controlling screen projection of multiple terminals from one terminal through a server that forwards screen projection control instructions. The solution solves the following problem in existing screen projection technologies: a screen projection sending end can only perform screen projection control on its own contents, and in the case of multiple screen projection sending ends, different screen projection sending ends need to be controlled respectively, causing complex and complicated operations.

Embodiment 2

Figure 2:
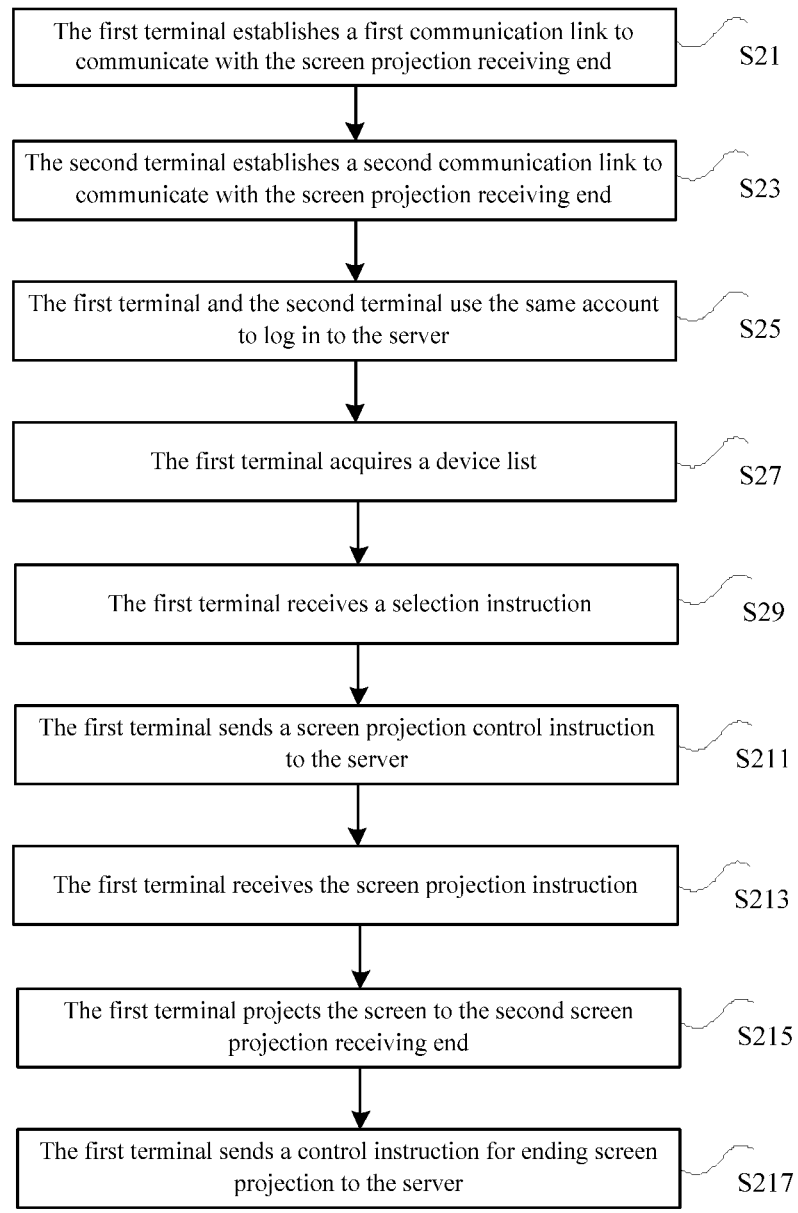
FIG. 2 is a flowchart illustrating another method for controlling screen projection according to an embodiment of the present disclosure.

According to an embodiment of the present disclosure, a method for controlling screen projection is provided. The server in this embodiment may be the server in Embodiment 1. FIG. 2 is a flowchart illustrating a method for controlling screen projection according to an embodiment of the present disclosure. With reference to FIG. 2, the method includes the following:

At step S21, a first terminal establishes a first communication link with a second screen projection receiving end.

Optionally, the above-mentioned screen projection receiving end may be an interactive flat panel. After the first terminal establishes communication with the second screen projection receiving end, when performing screen projection, the first terminal projects the screen to the second screen projection receiving end through the established communication link.

In an embodiment, the above-mentioned first communication link may be a socket link. After acquiring the IP address and port of the screen projection receiving end, the first terminal can establish a socket connection.

At step S23, a second terminal establishes a second communication link with the first screen projection receiving end.

Optionally, the second communication link has the same settings as the first communication link. It should be noted that the first screen projection receiving end and the second screen projection receiving end may be the same device, or may be two different devices.

Furthermore, the first communication link includes a first sub-link and a second sub-link, wherein the first sub-link is configured to transmit screen projection control signaling of the first terminal, and the second sub-link is configured to transmit multimedia data of the first terminal. The second communication link includes a third sub-link and a fourth sub-link, wherein the third sub-link is configured to transmit screen projection control signaling of the second terminal, and the fourth sub-link is configured to transmit multimedia data of the second terminal.

In the above solution, both the first communication link and the second communication link may include two socket connections, of which one is used to transmit screen projection control signaling, and the other is used to transmit multimedia data such as video streaming and audio streaming to the screen projection receiving end.

Two socket connections are established through the above-mentioned solution, so that the screen projection control signaling and multimedia data can be sent separately. Especially, when the network conditions are poor, transmission of the multimedia data may suffer. If the screen projection control signaling and the multimedia data were to be transmitted through the same link, it may cause the delay of the screen projection control signaling. However, the above-mentioned solution sends the screen projection control signaling and the multimedia data through different communication links. Since the data volume of the screen projection control signaling is small, even when the network conditions are poor, the screen projection control signaling can reach the screen projection receiving end in time without being affected by the network conditions.

At step S25, the first terminal and the second terminal use the same account to log in to the server.

Optionally, the above-mentioned server is a server that forwards the screen projection control instruction, and the account may be an account that is registered on the server in advance through information such as a telephone number, a user ID, and an email address.

In an embodiment, taking a conference scenario as an example, a user registers a corresponding account on the server through a user ID and password in advance. In the conference, if multiple terminals need to be controlled, the user logs in to an account on each terminal to connect to the server, and then can control one of the terminals itself and other terminals to project the screens through the one of the terminals.

In the above-mentioned solution, the second terminal is a terminal that uses the same account as the first terminal to log in to the server, and is configured to determine the second terminal that allows screen projection control to be performed by the first terminal.

The above-mentioned solution is based on an account system. After using the same account to log in to the server at different terminals, the logged-in terminals can complete mutual screen projection control.

At step S27, the first terminal acquires a device list, wherein the device list includes identification information of a second terminal, and the second terminal is a terminal that accesses a same server as the first terminal.

At step S29, the first terminal receives a selection instruction, wherein the selection instruction is used to select target identification information from the device list.

At step S211, the first terminal sends a screen projection control instruction to the server, wherein the screen projection control instruction includes target identification information, and the screen projection control instruction is forwarded to a target second terminal corresponding to the target identification information via the server, so as to control the target second terminal to project the screen to the first screen projection receiving end.

Figure 3:
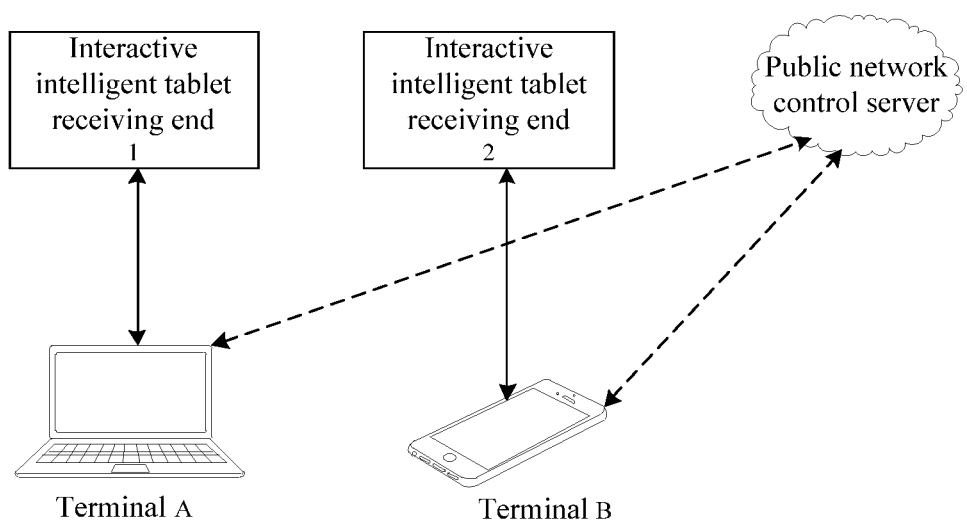
FIG. 3 is a schematic diagram illustrating a method for controlling screen projection according to an embodiment of the present disclosure.

FIG. 3 is a schematic diagram illustrating a method for controlling screen projection according to an embodiment of the present disclosure. With reference to FIG. 3, a screen projection receiving end includes an interactive flat panel receiving end 1 and an interactive flat panel receiving end 2, the server is a cloud server deployed remotely, and terminals may access the server through a public network. The terminals include a terminal A and a terminal B. If a user uses terminal A to control terminal B to project the screen, then terminal A is the first terminal, and the terminal B is the target second terminal. If the user uses terminal B to control terminal A to project the screen, then terminal B is the first terminal, and terminal A is the target second terminal.

In this embodiment, terminal A and the interactive flat panel receiving end 1 are connected under the same wireless router, and terminal B and the interactive flat panel receiving end 2 are connected under the same wireless router. Terminal A and terminal B respectively run a sending end program of wireless screen transmission, and both can communicate with the public network control server through the public network. The interactive flat panel receiving end 1 and the interactive flat panel receiving end 2 run a receiving end program of wireless screen transmission. A control server (a Web background server) runs in the public network environment and is responsible for maintaining the list of connected devices and querying forwarding control instructions.

Terminal A and terminal B establish connections with the interactive flat panel receiving end 1 and the interactive flat panel receiving end 2 through (but not limited to) sockets, respectively. Terminal A and terminal B establish two socket connections with the interactive flat panel receiving ends, respectively, of which one is used to transmit operation control signaling, and the other is used to transmit multimedia data (screen video streams and audio streams), so that terminal A and the terminal B can complete wireless screen transmission operations separately.

While terminal A and terminal B establish connections with the interactive flat panel receiving end 1 and the interactive flat panel receiving end 2, respectively, terminal A and terminal B log in to the public network control server through accounts (such as phone numbers of users), and then establish connections (such as Web Socket connections) with the public network, respectively. The public network control server maintains a list of terminal devices that have logged in and connected to the server. In the public network control server, each device in the device list is represented by a triplet of information, including: an account, a device name, and a terminal UUID. When terminal A and terminal B establish connections with the public network control server, the public network control server will report the device items with the same account to the rest of the terminals (excluding itself), so that terminal A and terminal B can respectively acquire other devices that log in with their own accounts through the public network control server, and construct a log-in device list that does not include terminal A or terminal itself. For example, the log-in device list of terminal A may include an iPhone, and the log-in device list of terminal B may include a MacBook computer.

When a user controls the screen transmission of another terminal A logged in by the user through a mobile terminal B, the user clicks on the device list (such as the MacBook) at terminal B, and terminal B sends an instruction to start screen projection to the public network control server (this instruction can be a two-tuple: device UUID and operation type, wherein the device UUID represents a unique ID of the device, and the operation type can include starting screen projection or receiving screen projection). For example, the two-tuple may include (device UUID, starting). The public network control server queries the device list maintained by itself and sends this instruction to terminal A. After receiving the instruction to start the screen projection, terminal A completes the screen projection through the socket connection previously established with the interactive flat panel receiving end 1.

At step S213 shown in FIG. 2, the first terminal receives a screen projection instruction, wherein the screen projection instruction is used to control the first terminal to project the screen to the second screencast receiving end.

Optionally, the above-mentioned screen projection instruction is a screen projection instruction directly sent to the first terminal. Compared with the above-mentioned screen projection control instruction, the difference is that the screen projection control instruction is used to control the target second terminal to perform screen projection, while the above-mentioned screen projection instruction is used to control the first terminal to perform screen projection.

In an embodiment, a control menu of the first terminal has a screen projection control, and a user can trigger the screen projection control to realize the screen projection control for the first terminal.

At step S215 shown in FIG. 2, the first terminal projects the screen to the second screen projection receiving end.

The above-mentioned second screen projection receiving end is a screen projection receiving end that has established a communication link with the first terminal in advance. Optionally, the first terminal projecting the screen to the second screen projection receiving end includes the first terminal capturing current display contents, the first terminal encoding the captured current display contents, and the first terminal sending the encoded contents to the second screen projection receiving end, wherein the second screen projection receiving end decodes the encoded contents and displays the decoded contents.

In an embodiment, the first terminal captures the current display content according to a certain sampling period to obtain an image of the current display interface, and then encodes the image to obtain a data stream after the image encoding. The first terminal sends the data stream to the second screen projection receiving end. The second screen projection receiving end decodes the data stream to obtain the image of the current display interface of the first terminal, and the second screen projection receiving end displays the decoded result, thus accomplishing the purpose that the first terminal projects the screen to the second screen projection receiving end.

At step S217 shown in FIG. 2, the first terminal sends a control instruction to end the screen projection to the server, wherein the control instruction to end the screen projection is forwarded to the target second terminal via the server, so as to control the target second terminal to stop projecting the screen to the first screen projection receiving end.

Optionally, the above-mentioned control instruction for ending screen projection may be sent by the user to the first terminal. After receiving the control instruction for ending screen projection sent by the user, the first terminal forwards the control instruction for ending screen projection to the server. It should be noted that the control instruction for ending screen projection may also include the identification information of the target second terminal, and is used to cause the server to find the target second terminal according to the identification information included in the control instruction for ending screen projection, and send the control instruction for ending screen projection to the target second terminal. After the target second terminal receives the control instruction for ending screen projection, the data stream obtained by encoding the current display content ceases to be sent to the first screen projection receiving end.

Figure 4:
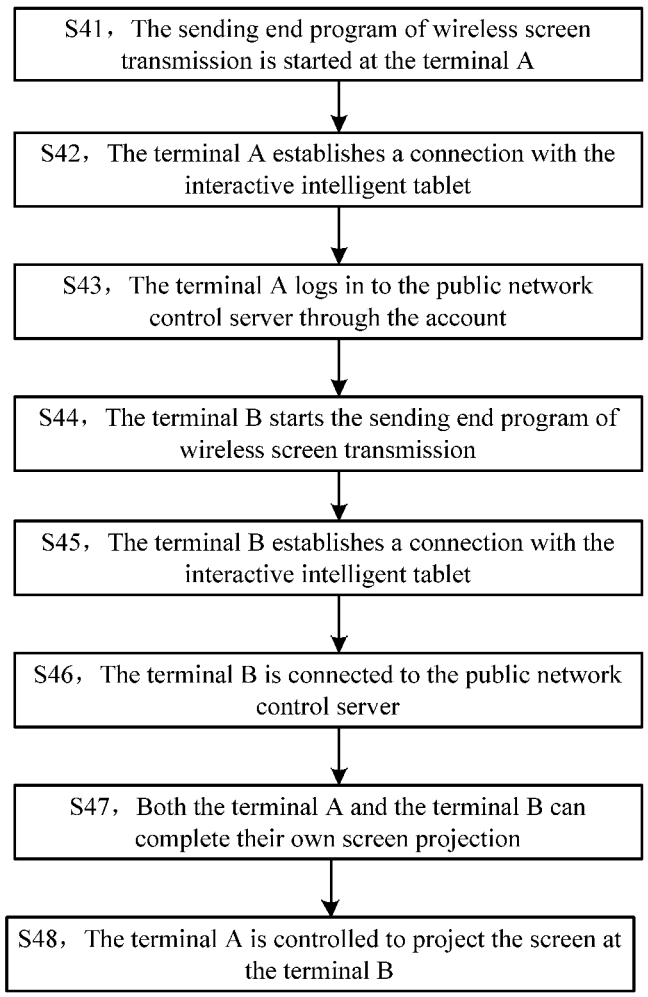
FIG. 4 is a flowchart illustrating a method for controlling screen projection according to an embodiment of the present disclosure.

FIG. 4 is a flowchart illustrating a method for controlling screen projection according to an embodiment of the present disclosure. The method is applied in the structure of FIG. 3. Hereinafter, an example of projecting a screen by using the method for controlling screen projection will be described with reference to FIGS. 3 and 4.

At S41, a sending end program of wireless screen transmission is started at the terminal A.

In the process of screen projection, the terminal A is the sending end, and the sending end program can be started by starting the screen projection application at the terminal A.

At S42, the terminal A establishes a connection with an interactive flat panel.

The terminal A is installed with a sending end screen projection application for running the sending end program of wireless screen transmission, and the interactive flat panel is installed with a receiving end screen projection application for running a receiving end program of wireless screen transmission. Terminal A establishes a connection with the receiving end program of wireless screen transmission of the interactive flat panel through the sending end program of wireless screen transmission.

In the same wireless local area network, terminal A can establish two socket connections (through two ports) through the IP address and port of the interactive tablet, of which one is used to transmit screen projection control signaling, and the other is used to transmit screen media data such as video streams and audio streams.

At S43, terminal A logs in to the public network control server through the account.

After terminal A establishes a connection with the interactive flat panel receiving end, terminal A logs in to a public network control server through an account (such as a mobile phone number of the user), and the public network control server will add a device list item, such as (1886886688, iPhone, 23sdfifkkkrff44rtyg44555ertfgywe). Then, terminal A establishes a connection (such as a Web Socket) with the public network control server.

At S44, terminal B starts the sending end program of wireless screen transmission.

At S45, terminal B establishes a connection with the interactive flat panel.

The above-mentioned interactive flat panel and the interactive flat panel in Step S42 may be the same interactive flat panel.

In the same wireless local area network, terminal B establishes two socket connections (two ports) through the IP address and port of the interactive flat panel, of which one is used to transmit screen projection control signaling, and the other is used to transmit media data such as screen video streams and audio streams.

At S46, terminal B is connected to the public network control server.

After the terminal B establishes a connection with the interactive flat panel receiving end, terminal B logs in to the public network control server through an account (such as phone number of the user), and the public network control server will add a device list item, such as (1886886688, MacBook, uydfhy7893ijuduy765tgyhytrfedwsd). Then, terminal B establishes a connection (such as a Web Socket) with the public network control server.

At S47, both terminal A and terminal B can complete their own screen projection.

When terminal A needs to project the screen, the screen can be projected according to the connection established in S42. When terminal B needs to project the screen, the screen can be projected according to the connection established in S45.

At S48, terminal A is controlled to project the screen at terminal B, which comprises the following steps:

a. A user sends an instruction to start screen projection to the public network control server by clicking on an item (such as a MacBook computer) in the log-in device list at terminal B.

Optionally, when the user clicks the item, a selection instruction is sent to terminal B. In this example, there are two terminals: terminal A and terminal B. Therefore, the device list received by terminal B includes an item corresponding to terminal A. The screen projection control instruction may be (23sdfifkkkrff44rtyg44555ertfgywe, starting screen projection), wherein "23sdfifkkkrff44rtyg44555ertfgywe" is the UUID of terminal A.

b. The public network control server queries its own device list according to the UUID of the device in the instruction, finds a corresponding item (that is, terminal A), and then sends the screen projection control instruction to terminal A through the Web Socket connection established in S43.

c. Terminal A then completes the screen projection through the connection established in step S42, at which point the user has completed controlling terminal A to project the screen at terminal B.

Similarly, the user can also control terminal B to project the screen at terminal A. The process is similar to that in S48, which will not be described again herein.

Embodiment 3

Figure 5:
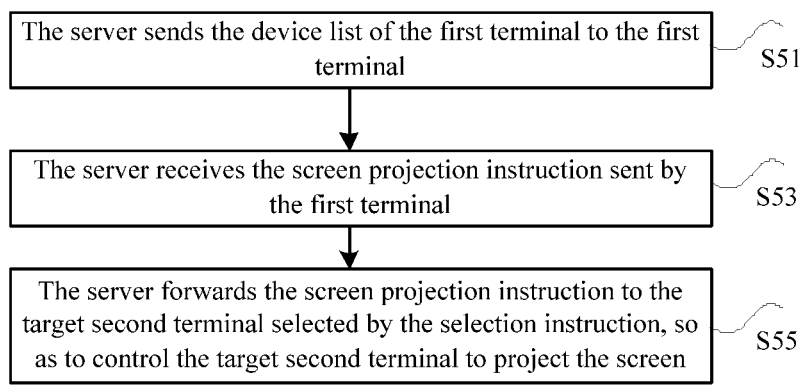
FIG. 5 is a flowchart illustrating another method for controlling screen projection according to an embodiment of the present disclosure.

According to an embodiment of the present disclosure, a method for controlling screen projection is provided. The server in this embodiment may be the server in Embodiment 1. FIG. 5 is a flowchart illustrating a method for controlling screen projection according to an embodiment of the present disclosure. With reference to FIG. 5, the method includes the following:

At step S51, the server sends a device list associated with a first terminal to the first terminal, wherein the device list includes identification information of a second terminal, and the second terminal is a terminal that accesses a same server as the first terminal.

First, it should be noted that after receiving a request for the device list sent by the first terminal, the server can return the device list to the first terminal; after the first terminal accesses the server, the server can also directly send the corresponding device list to the first terminal.

Furthermore, it should be noted that the first terminal may be any terminal that communicates with the server, and the second terminals are other terminals in the system. In an embodiment, the server may send a corresponding device list to each terminal, and the device list may include identification information of other terminals except the receiving terminal itself.

Optionally, the identification information of the second terminal may be the UUID of the second terminal. After the first terminal and the second terminal use the same account to log in to the server, the server determines the terminals that allow screen projection control to be performed mutually. A user can select any one of these terminals as the first terminal and initiate a request for acquiring the device list to the server. The second terminals may include other terminals except for the first terminal. The server constructs a device list according to the identification information of the second terminals, sends the device list to the first terminal, and the first terminal receives the device list.

In an embodiment, terminals connected to a same router use a same account to log in to the server, and a user selects one of the terminals for operation. The one of the terminal is the first terminal, and the other terminals are the second terminals. The user sends a request for a device list through the first terminal. After receiving the request for the device list, the server constructs the device list according to the identification information of one or more second terminals, and returns the device list to the first terminal.

At step S53, the server receives the screen projection control instruction sent by the first terminal, wherein the screen projection control instruction is determined according to a selection instruction received by the first terminal, and the selection instruction is used to select target identification information from the device list.

Optionally, the above-mentioned screen projection control instruction includes identification information of a target second terminal, which is used by the server to determine the target second terminal selected by the user. It can be understood that the selection instruction received by the above-mentioned first terminal is a triggering condition for the first terminal to send the screen projection control instruction. After receiving the selection instruction, the first terminal constructs a screen projection control instruction to be sent to the server according to the received selection instruction.

In an embodiment, after receiving the selection instruction and determining the target second terminal, the first terminal constructs the screen projection control instruction according to the identification information of the target second terminal, and sends the screen projection control instruction to the server, and subsequent projection control is performed by the server.

At step S55, the server forwards the screen projection control instruction to the target second terminal corresponding to the target identification information, so as to control the target second terminal to project the screen to the first screen projection receiving end.

After receiving the screen projection control instruction, the server sends the screen projection control instruction to the target second terminal according to the identification information of the target second terminal carried in the screen projection control instruction, so as to perform screen projection control over the target second terminal.

The above-mentioned solution is suitable for a scenario where a user needs to perform screen projection control at multiple terminals. Taking a conference scenario as an example, if contents stored in multiple devices are to be projected on the screens in the conference, the conference host needs to switch back and forth between different terminals. If the above-mentioned solution is used, the conference host only needs to perform control at one main control terminal (that is, the above-mentioned first terminal), and screen projection control of all terminals in the local area network can be completed. This simplifies the operation associated with controlling the screen projection of multiple terminals and increases the convenience of screen projection control.

As set forth herein, in the above-mentioned embodiments of the present disclosure, a server receives a request for acquiring a device list for a first terminal, and the server sends the device list to the first terminal. The device list includes the identification information of a second terminal, and the second terminal is a terminal that accesses a same server as the first terminal. The server receives the screen projection control instruction sent by the first terminal, wherein the screen projection control instruction is determined according to a selection instruction received by the first terminal, and the selection instruction is used to select target identification information from the device list. The server forwards the screen projection control instruction to a target second terminal corresponding to the target identification information, so as to control the target second terminal to project the screen. The above-mentioned solution has the technical effect of controlling screen projection of multiple terminals from one terminal through a server that forwards screen projection control instructions. The solution solves the following problem in existing screen projection technologies: a screen projection sending end can only perform screen projection control on its own contents, and in the case of multiple screen projection sending ends, different screen projection sending ends need to be controlled respectively, causing complex and complicated operations.

In an embodiment, the server sending the device list of the first terminal to the first terminal includes the server determining the terminals that use a same account to log in to the server, and the server generates the device list of the first terminal according to the identification information of other terminals other than the first terminal.

In an embodiment, forwarding the screen projection control instruction to the target second terminal corresponding to the target identification information so as to control the target second terminal to project the screen to the first screen projection receiving end includes: the server parsing out the target identification information from the screen projection control instruction, the server determining the target second terminal according to the target identification information, and the server forwarding the screen projection control instruction to the target second terminal.

Optionally, the above-mentioned identification information of the target second terminal may be an UUID of the target second terminal. In an embodiment, the screen projection control instruction is (23sdfifkkkrff44rtyg44555ertfgywe, starting screen projection). After receiving the screen projection control instruction, the server parses out the identification information "23sdfifkkkrff44rtyg44555ertfgywe" of the target second terminal, and finds the target second terminal according to the identification information. After finding the target second terminal, the server forwards the screen projection control instruction to the target second terminal, so as to control the target second terminal to project the screen.

Embodiment 4

Figure 6:
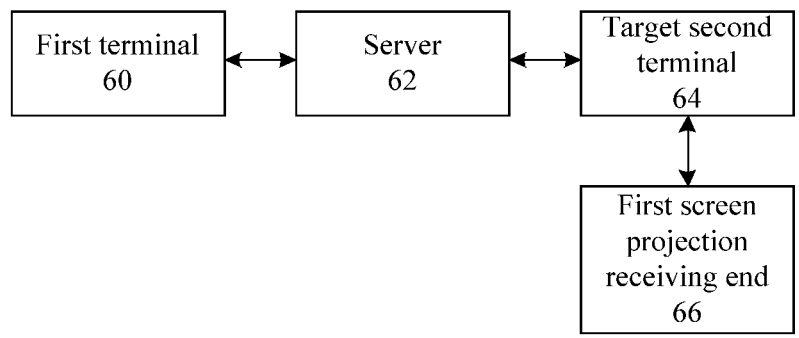
FIG. 6 is a schematic diagram illustrating a system for controlling screen projection according to an embodiment of the present disclosure.

According to an embodiment of the present disclosure, a system for controlling screen projection is provided. FIG. 6 is a schematic diagram of a system for controlling screen projection according to an embodiment of the present disclosure. With reference to FIG. 6, the system includes:

a first terminal 60 configured to acquire a device list, receive a selection instruction, and send a screen projection control instruction to a server, wherein the device list includes identification information of a second terminal, the second terminal is a terminal that accesses a same server as the first terminal, and the selection instruction is used to select target identification information from the device list.

Optionally, the above-mentioned first terminal is a terminal that performs screen projection control, the device list is sent by the screen projection server to the first terminal, and the device list is used to provide the identification information of the second terminal to the first terminal. The second terminal may be a terminal over which screen projection controlled may be performed by the first terminal. The above-mentioned selection instruction may be sent by a user through the operation of the first terminal. The selection instruction is used to select the second terminal from the device list over which screen projection control is to be performed. The number of selected target second terminals may be one or more. The above-mentioned second terminal that allows screen projection control to be performed by the first terminal may be a terminal that is in the same local area network as the first terminal and has established a communication link with the server. The above-mentioned screen projection control instruction includes the identification information of a target second terminal, which is used by the server to determine the target second terminal selected by the user.

In an embodiment, the first terminal sends a request for a device list to the server, receives the device list returned by the server, and the user selects a target second terminal from the device list over which screen projection control is to be performed. The first terminal generates a screen projection control instruction carrying identification information of the target second terminal according to the selection of the user, and sends the screen projection control instruction to the server.

The system may include a server 62 configured to communicate with the first terminal and forward the screen projection control instruction to the target second terminal corresponding to the identification information.

After receiving the screen projection control instruction, the server sends the screen projection control instruction to the target second terminal according to the identification information of the target second terminal carried in the screen projection control instruction, so as to perform screen projection control over the target second terminal.

The system may include a target second terminal 64 configured to communicate with the server and the receiving end, and project the screen to the first screen projection receiving end according to the screen projection control instruction.

Optionally, the target second terminal can perform socket connections through the IP address and port of the receiving end. The socket connections include two socket connections, of which one is used to transmit screen projection control signaling, and the other is used to transmit media data such as screen video streams and audio streams.

The communications between the target second terminal and the server may be realized over a public network, and a screen projection control instruction sent by the server may be received through the communications.

The system may include a first screen projection receiving end 66 configured to communicate with the target second terminal, and display screen projection contents of the target second terminal.

In the above-mentioned solution, the technical effect of controlling the target second terminal to project the screen to the receiving end is achieved through the first terminal. However, the roles of the first terminal and the second terminal are not fixed and can be switched. For example, the terminal being operated on may be the above-mentioned first terminal, and the terminal being controlled may be the above-mentioned second terminal.

It should also be noted that the above-mentioned solution does not interfere with screen projection control performed by the first terminal or the second terminal itself. The first terminal and the second terminal can also control themselves to project a screen to the above-mentioned receiving end or another receiving end by establishing a connection with the receiving end.

The above-mentioned solution is suitable for a scenario where a user needs to perform screen projection control on multiple terminals. Taking a conference scenario as an example, if contents stored in multiple devices need to be projected on the screens in the conference, a conference host needs to switch back and forth between different terminals. If the above-mentioned solution is used, the conference host only needs to perform control at one main control terminal (that is, the above-mentioned first terminal), by which the screen projection control of all terminals in the local area network may be accomplished. This simplifies the operation associated with controlling screen projection of multiple terminals and increases the convenience of screen projection control.

In an embodiment, the first terminal and the second terminal are in the same local area network.

Optionally, the first terminal and the second terminal are in the same local area network, and the first terminal and the second terminal may be connected to a same router.

In an embodiment, the first terminal and the second terminal use a same account to log in to the server.

Optionally, after the first terminal and the second terminal use the same account to log in to the server, the server determines the terminals that allow screen projection control to be performed mutually. A user can select any one of these terminals as the first terminal and initiate a request for acquiring a device list to the server. The second terminals may include other terminals except for the first terminal. The server constructs a device list according to the identification information of the second terminals, sends the device list to the first terminal, and the first terminal receives the device list.

In an embodiment, the terminals connected to a same router use the same account to log in to the server, and the user selects one of the terminals for operation. The one of the terminal is the first terminal, and the other terminals are the second terminals. The user sends a request for acquiring the device list through the first terminal. After receiving the request for the device list, the server constructs the device list according to the identification information of one or more second terminals, and returns the device list to the first terminal.

In an embodiment, a first communication link is provided between the first terminal and the second screen projection receiving end, and a second communication link is provided between the second terminal and the first screen projection receiving end.

In an embodiment, both of the above-mentioned first communication link and second communication link may be socket links. After acquiring the IP address and port of the screen projection receiving end, the first terminal and the second terminal can establish a socket connection.

Furthermore, the above-mentioned first communication link may include two socket connections, of which one is used to transmit screen projection control signaling, and the other is used to transmit multimedia data such as video streams and audio streams to the screen projection receiving end.

Two socket connections are established through the above solution, so that the screen projection control signaling and multimedia data can be sent separately. Especially, when network conditions are poor, transmission of the multimedia data may suffer. If the screen projection control signaling and the multimedia data were to be transmitted through the same link, it may cause delay of the screen projection control signaling. However, the above-mentioned solution sends the screen projection control signaling and the multimedia data through different communication links. Since the data volume of the screen projection control signaling is small, even when the network conditions are poor, the screen projection control signaling can reach the screen projection receiving end in time without being affected by the network conditions.

In an embodiment, both the first screen projection receiving end and the second screen projection receiving end are interactive flat panels.

Embodiment 5

Figure 7:
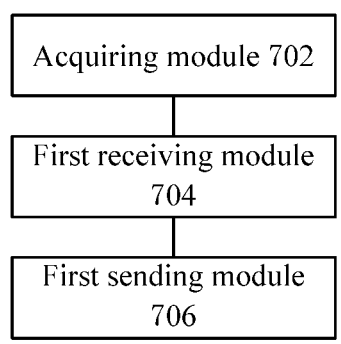
FIG. 7 is a schematic diagram illustrating a device for controlling screen projection according to an embodiment of the present disclosure.

According to an embodiment of the present disclosure, a device for controlling screen projection is provided. FIG. 7 is a schematic diagram of a device for controlling screen projection according to an embodiment of the present disclosure. With reference to FIG. 7, the device includes:

an acquiring module 702 configured to acquires a device list for a first terminal, wherein the device list includes identification information of a second terminal, and the second terminal is a terminal that accesses a same server as the first terminal;

a first receiving module 704 configured to receives a selection instruction for the first terminal, wherein the selection instruction is used to select target identification information from the device list; and a first sending module 706 configured to sends a screen projection control instruction from the first terminal to the server, wherein the screen projection control instruction includes target identification information, and the screen projection control instruction is forwarded to a target second terminal corresponding to the target identification information via the server, so as to control the target second terminal to project the screen to a first screen projection receiving end.

In an embodiment, the above-mentioned device further includes a login module that may be used by the first terminal and the second terminal log in to the server by using the same account, before the first terminal acquires the device list.

In an embodiment, the above-mentioned acquiring module includes a receiving sub-module configured to receive, for the first terminal, the device list sent by the server, wherein the server generates the device list after the first terminal and the second terminal log in to the server using the same account.

In an embodiment, the first sending module includes a generating sub-module configured to generate, for the first terminal, a screen projection control instruction according to a selection instruction, wherein the screen projection control instruction includes identification information of a target second terminal. The first sending module further includes a sending sub-module configured to send the screen projection control instruction from the first terminal to the server.

In an embodiment, the above-mentioned device further includes a first establishing module configured to establish, before the first terminal acquires the device list, a first communication link between the first terminal and the second screen projection receiving end. The above-mentioned device further includes a second establishing module configured to establish a second communication link between the second terminal and the first screen projection receiving end.

In the first communication link includes a first sub-link and a second sub-link, wherein the first sub-link is configured to transmit the screen projection control signaling of the first terminal, and the second sub-link is configured to transmit multimedia data of the first terminal. The second communication link includes a third sub-link and a fourth sub-link, wherein the third sub-link is configured to transmit the screen projection control signaling of the second terminal, and the fourth sub-link is configured to transmit multimedia data of the second terminal.

In an embodiment, the above-mentioned device further includes a second receiving module configured to receive, for the first terminal, a screen projection instruction, wherein the screen projection instruction is used to control the first terminal to project the screen to the second screen projection receiving end. The above-mentioned device further includes a screen projection module configured to project the screen from the first terminal to the second screen projection receiving end.

In an embodiment, the screen projection module includes a capturing module configured to capture the current display contents of the first terminal, and an encoding module configured to encode the captured current display contents of the first terminal, and send the encoded contents to the second screen projection receiving end, wherein the second screen projection receiving end decodes the encoded contents, and displays the decoded contents.

In an embodiment, the above-mentioned device further includes a second sending module configured to send, after the first terminal sends the screen projection control instruction to the server, the control instruction for ending screen projection from the first terminal to the server, wherein the control instruction for ending screen projection is forwarded to the target second terminal via the server, so as to control the target second terminal to cease projecting the screen to the first screen projection receiving end.

Embodiment 6

Figure 8:
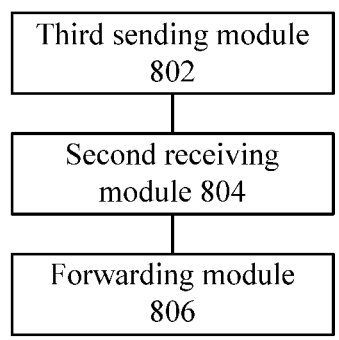
FIG. 8 is a schematic diagram illustrating another device for controlling screen projection according to an embodiment of the present disclosure.

According to an embodiment of the present disclosure, a device for controlling screen projection is provided. FIG. 8 is a schematic diagram of a device for controlling screen projection according to an embodiment of the present disclosure. With reference to FIG. 8, the device includes:

A third sending module 802 configured to send a device list for a first terminal from a server to the first terminal, wherein the device list includes identification information of a second terminal, and the second terminal is a terminal that uses the same account as the first terminal to log in to the server.

The device further includes a second receiving module 804 configured to receive, at the server, a screen projection control instruction sent by the first terminal, wherein the screen projection control instruction is determined according to the selection instruction received by the first terminal, and the selection instruction is used to select target identification information from the device list.

The device further includes a forwarding module 806 configured to forward the screen projection control instruction from the server to a target second terminal corresponding to the target identification information, so as to control the target second terminal to project the screen to the first screen projection receiving end.

In an embodiment, the third sending module includes a determining sub-module configured to determine, at the server, the terminal that uses the same account to log in to the server. The third sending module further includes a generating sub-module configured to generate, at the server, the device list for the first terminal according to the identification information of other terminals except for the first terminal.

In an embodiment, the forwarding module includes a parsing sub-module configured to parse out, at the server, the identification information of the target second terminal from the screen projection control instruction. The forwarding module further include a determining sub-module configured to determine, at the server, the target second terminal according to the target identification information. The forwarding module further includes a forwarding sub-module configured to forward the screen projection control instruction from the server to the target second terminal.

Embodiment 7

According to an embodiment of the present disclosure, a storage medium is provided, the storage medium includes instructions or programs that, when executed by a device, cause the device to execute the following steps: acquiring, at a first terminal, a device list, wherein the device list includes identification information of a second terminal, and the second terminal is a terminal that accesses the same server as the first terminal; receiving, at the first terminal, a selection instruction, wherein the selection instruction is used to select target identification information from the device list; sending, from the first terminal, a screen projection control instruction to a server, wherein the screen projection control instruction includes the target identification information, and the screen projection control instruction is forwarded to a target second terminal corresponding to the target identification information via the server, so as to control the target second terminal to project the screen to a first screen projection receiving end.

Furthermore, when the program or instructions are executed, they cause the device to execute other steps in Embodiment 1 or Embodiment 2.

Embodiment 8

According to an embodiment of the present disclosure, a processor is provided and configured to execute programs or instructions that cause the following steps to be executed: a first terminal acquiring a device list, wherein the device list includes identification information of a second terminal, and the second terminal is a terminal that accesses a same server as the first terminal; the first terminal receiving a selection instruction, wherein the selection instruction is used to select target identification information from the device list; the first terminal sending a screen projection control instruction to the server, wherein the screen projection control instruction includes the target identification information, and the screen projection control instruction is forwarded to a target second terminal corresponding to the target identification information via the server, so as to control the target second terminal to project the screen to a first screen projection receiving end.

Furthermore, when the programs or instructions are running, they cause other steps in Embodiment 1 or Embodiment 2 to be executed.

The sequence of operations described in the above-mentioned embodiments of the present disclosure are only for illustration purposes, and do not represent the superiority of one embodiment over another.

In the above-mentioned embodiments of the present disclosure, the description of each embodiment has its own focus. For parts that are not described in detail in an embodiment, reference may be made to related descriptions of other embodiments.

In the embodiments provided in the present disclosure, it should be understood that the disclosed techniques can be implemented in other manners. The device embodiments described herein are only illustrative. For example, the division of units may be based on a logical function division. In an actual implementation, multiple units or components may be combined or may be integrated into another system, or some features can be omitted or not executed. In addition, the displayed or discussed mutual coupling, direct coupling, or communication connections may be realized through indirect coupling or connections of multiple interfaces, units, or modules, in electrical or other forms.

The units described herein as separate components may or may not be physically separated, and the components displayed as units may or may not be physical units. That is, they may be located in one place, or may be distributed among multiple units. A part or all of the units may be selected according to actual needs to achieve the objective of the solutions described in the embodiments.

In addition, the respective functional units in each embodiment of the present disclosure may be integrated into one processing unit, or each unit may exist alone physically, or two or more units may be integrated into one unit. The above-mentioned integrated unit may be realized in the form of hardware, or may be realized in the form of software functional units.

If the integrated unit is implemented in the form of software functional units and sold or used as an independent product, the integrated unit can be stored in a computer-readable storage medium. Based on this understanding, the technical solutions described in the present disclosure, or the part of the technical solutions that contributes to the existing technology can be embodied in the form of software products. Such computer software products may be stored in a storage medium and may include instructions for causing a computer device (which can be a personal computer, a server, a network device, etc.) to execute all or a portion of the steps of the method described in each embodiment of the present disclosure. The aforementioned storage media may include a USB flash disk, Read-Only Memory (ROM), Random Access Memory (RAM), a mobile hard disk, a magnetic disk or optical disk, and/or other media that can store program code.

The above are only the preferred embodiments of the present disclosure. It should be pointed out that for those skilled in the art, without departing from the principle of the present disclosure, may make improvements and modifications, and these improvements and modifications should also be regarded as within the claimed scope of the present disclosure.

INDUSTRIAL APPLICABILITY

In the embodiments of the present disclosure, a first terminal acquires a device list, wherein the device list includes identification information of a second terminal, and the second terminal is a terminal that accesses a same server as the first terminal; the first terminal receives a selection instruction, wherein the selection instruction is used to select target identification information from the device list; the first terminal sends a screen projection control instruction to the server, wherein the screen projection control instruction includes the target identification information, and the screen projection control instruction is forwarded to a target second terminal corresponding to the target identification information via the server, so as to control the target second terminal to project the screen to a first screen projection receiving end. The technical effect of controlling screen projection of multiple terminals by one terminal is realized through the server forwarding the screen projection control instruction. The disclosed techniques solve the following problem in existing screen projection technologies: a screen projection sending end can only perform screen projection control on its own contents, and as a result, in the case of multiple screen projection sending ends, different screen projection sending ends need to be controlled respectively, causing complex and complicated operations.

What is claimed is:

1. A method for controlling screen projection, comprising:
   acquiring, by a first terminal, a device list, wherein the device list is generated by a screen projection server according to identification information of a second terminal, the device list includes the identification information of the second terminal, the first terminal and the second terminal are configured to accesses the screen projection server, the first terminal is a controlling end that performs screen projection control, the second terminal is a controlled end on which screen projection control is performed by the first terminal, and the second terminal and the first terminal are in a same local area network;
   receiving, by the first terminal, a selection instruction, wherein the selection instruction is used to select the identification information of the second terminal from the device list; and
   sending, by the first terminal, a screen projection control instruction to the screen projection server, wherein the screen projection control instruction includes the identification information of the second terminal, and the screen projection control instruction is forwarded to the second terminal corresponding to the identification information of the second terminal via the screen projection server, so as to control the second terminal to project the screen to a first screen projection receiving end,
   wherein, the first terminal, the second terminal, and the first screen projection receiving end are all installed with screen projection application software, the screen projection application software installed on the first terminal and the second terminal is used to acquire display contents of the first and second terminals as screen projection data and send the screen projection data to the first screen projection receiving end, and the screen projection application software installed on the first screen projection receiving end is used to receive the screen projection data, convert the screen projection data to obtain screen projection contents, and display the screen projection contents.

2. The method according to claim 1, further comprising, prior to acquiring the device list, using, by the first terminal and the second terminal, an account to log in to the screen projection server.

3. The method according to claim 2, wherein acquiring, by the first terminal, the device list comprises:
   receiving, by the first terminal, the device list sent by the screen projection server, wherein the device list is generated by the screen projection server after the first terminal and the second terminal use the account to log in to the screen projection server.

4. The method according to claim 1, wherein sending, by the first terminal, the screen projection control instruction to the screen projection server comprises:
   generating, by the first terminal, the screen projection control instruction according to the selection instruction, wherein the screen projection control instruction includes the identification information of the second terminal; and
   sending, by the first terminal, the screen projection control instruction to the screen projection server.

5. The method according to claim 1, further comprising, prior to acquiring the device list:
   establishing, by the first terminal, a first communication link with a second screen projection receiving end.

6. The method according to claim 5, wherein
   the first communication link includes a first sub-link and a second sub-link, wherein the first sub-link is configured to transmit screen projection control signaling of the first terminal, and the second sub-link is configured to transmit multimedia data of the first terminal.

7. The method according to claim 6, further comprising:
   receiving, by the first terminal, a screen projection instruction, wherein the screen projection instruction is used to control the first terminal to project the screen to the second screencast receiving end; and
   projecting, by the first terminal, the screen to the second screen projection receiving end.

8. The method according to claim 7, wherein projecting, the first terminal, the screen to the second screen projection receiving end comprises:
   capturing, by the first terminal, current display contents; and
   encoding, by the first terminal, the captured current display contents, and sending the encoded display contents to the second screen projection receiving end, wherein the encoded display contents are decoded and displayed by the second screen projection receiving end.

9. The method according to claim 1, further comprising, prior to sending the screen projection control instruction to the screen projection server:
   sending, by the first terminal, a control instruction for ending screen projection to the screen projection server, wherein the control instruction for ending screen projection is forwarded to the second terminal via the screen projection server, so as to control the second terminal to stop projecting the screen to the first screen projection receiving end.

10. A method for controlling screen projection, comprising:
    sending, by a screen projection server, a device list of a first terminal to the first terminal, wherein the device list is generated by the screen projection server according to identification information of a second terminal, the device list includes the identification information of the second terminal, the first terminal and the second terminal are configured to accesses the screen projection server, the first terminal is a controlling end that performs screen projection control, the second terminal is a controlled end on which screen projection control is performed by the first terminal, and the second terminal and the first terminal are in the same local area network;
    receiving, by the screen projection server, a screen projection control instruction sent by the first terminal, wherein the screen projection control instruction includes the identification information of the second terminal, the screen projection control instruction is determined according to a selection instruction received by the first terminal, and the selection instruction is used to select the identification information of the second terminal from the device list; and forwarding, by the screen projection server, the screen projection control instruction to the second terminal corresponding to the identification information of the second terminal, so as to control the second terminal to project the screen to a first screen projection receiving end;

wherein, the first terminal, the second terminal, and the first screen projection receiving end are all installed with screen projection application software, the screen projection application software installed on the first terminal and the second terminal is used to acquire display contents of the first and second terminals as screen projection data and send the screen projection data to the first screen projection receiving end, and the screen projection application software installed on the first screen projection receiving end is used to receive the screen projection data, convert the screen projection data to obtain screen projection contents, and display the screen projection contents.

11. The method according to claim 10, wherein sending, by the screen projection server, the device list of the first terminal to the first terminal comprises:

determining, by the screen projection server, one or more terminals that use the account to log in to the screen projection server; and generating, by the screen projection server, the device list of the first terminal according to the identification information of terminals other than the first terminal.

12. The method according to claim 10, wherein forwarding the screen projection control instruction to the second terminal corresponding to the identification information of the second terminal, so as to control the second terminal to project the screen to the first screen projection receiving end comprises:

parsing, by the screen projection server, out the identification information of the second terminal from the screen projection control instruction;

determining, by the screen projection server, a target second terminal according to the identification information of the second terminal; and forwarding, by the screen projection server, the screen projection control instruction to the target second terminal.

13. A system for controlling screen projection, comprising:

a first terminal configured to acquire a device list, receive a selection instruction, and send a screen projection control instruction to a screen projection server, wherein the device list is generated by the screen projection server according to identification information of a second terminal, the device list includes the identification information of the second terminal, the first terminal and the second terminal are configured to access the screen projection, the first terminal is a controlling end that performs screen projection control, the second terminal is a controlled end on which screen projection control is performed by the first terminal, the second terminal and the first terminal are in the same local area network, and the selection instruction is used to select the identification information of the second terminal from the device list;

the screen projection server, wherein the screen projection server is configured to communicate with the first terminal and forward the screen projection control instruction to the second terminal corresponding to the identification information of the second terminal, and wherein the screen projection control instruction includes the identification information of the second terminal; and the second terminal, wherein the second terminal is configured to communicate with the screen projection server and a first screen projection receiving end and project the screen to the first screen projection receiving end according to the screen projection control instruction; and the first screen projection receiving end, wherein the first screen projection receiving end is configured to communicate with the second terminal and display screen projection contents of the second terminal;

wherein, the first terminal, the second terminal, and the first screen projection receiving end are all installed with screen projection application software, the screen projection application software installed on the first terminal and the second terminal is used to acquire display contents of the terminals as screen projection data and send the screen projection data to the first screen projection receiving end, and the screen projection application software installed on the first screen projection receiving end is used to receive the screen projection data, convert the screen projection data to obtain the screen projection contents, and display the screen projection contents.

14. The system according to claim 13, wherein the first terminal and the second terminal are in the same local area network.

15. The system according to claim 13, wherein a first communication link is provided between the first terminal and a second screen projection receiving end, and a second communication link is provided between the second terminal and the first screen projection receiving end.

16. The system according to claim 15, wherein both the first screen projection receiving end and the second screen projection receiving end are interactive flat panels.

* * * * *